US 6,720,695 B2

(12) United States Patent
Coenen

(10) Patent No.: US 6,720,695 B2
(45) Date of Patent: Apr. 13, 2004

(54) ROTOR SPINNING DEVICE WITH A CONTACTLESS, PASSIVE, RADIAL BEARING FOR THE SPINNING ROTOR

(75) Inventor: Norbert Coenen, Mönchengladbach (DE)

(73) Assignee: W. Schlafhorst AG & Co. (DE)

( * ) Notice: Subject to any disclaimer, the term of this patent is extended or adjusted under 35 U.S.C. 154(b) by 18 days.

(21) Appl. No.: 09/898,938

(22) Filed: Jul. 3, 2001

(65) Prior Publication Data

US 2002/0047404 A1 Apr. 25, 2002

(30) Foreign Application Priority Data

Jul. 4, 2000 (DE) .......................................... 100 32 440

(51) Int. Cl.⁷ ............................................... H02K 7/09
(52) U.S. Cl. .................................................... 310/90.5
(58) Field of Search ................................. 310/90.5, 51

(56) References Cited

U.S. PATENT DOCUMENTS

| | | | |
|---|---|---|---|
| 3,650,581 A | | 3/1972 | Boden et al. .................. 308/10 |
| 3,845,997 A | | 11/1974 | Boden et al. .................. 308/10 |
| 3,860,300 A | * | 1/1975 | Lyman ....................... 310/90.5 |
| 3,934,950 A | * | 1/1976 | Kuhlmann ................. 310/90.5 |
| 4,037,886 A | | 7/1977 | Boden et al. .................. 308/10 |
| 4,082,376 A | | 4/1978 | Wehde et al. ................. 308/10 |
| 4,363,525 A | * | 12/1982 | Poubeau ....................... 310/90 |
| 4,379,598 A | * | 4/1983 | Goldowsky ................. 310/90.5 |
| 4,473,259 A | * | 9/1984 | Goldowsky ................. 104/281 |
| 4,644,205 A | * | 2/1987 | Sudo et al. ................. 310/90.5 |
| 4,686,404 A | * | 8/1987 | Nakazeki et al. ........... 310/90.5 |
| 4,763,032 A | * | 8/1988 | Bramm et al. .............. 310/90.5 |
| 4,841,212 A | * | 6/1989 | Matsushita et al. ........ 310/90.5 |
| 4,910,633 A | * | 3/1990 | Quinn ......................... 310/90.5 |
| 5,126,610 A | | 6/1992 | Fremerey ................... 310/90.5 |
| 5,385,007 A | * | 1/1995 | Hartel et al. ................... 57/76 |
| 5,834,867 A | * | 11/1998 | Kikuchi et al. ................ 310/51 |
| 6,034,456 A | * | 3/2000 | Osama et al. ................ 310/112 |
| 6,181,040 B1 | * | 1/2001 | Schob ........................ 310/103 |
| 6,220,009 B1 | | 4/2001 | Coenen ......................... 57/406 |
| 6,249,067 B1 | * | 6/2001 | Schob et al. ............... 310/68 B |
| 6,255,752 B1 | * | 7/2001 | Werner ...................... 310/90.5 |

FOREIGN PATENT DOCUMENTS

| | | |
|---|---|---|
| DE | 2 248 695 | 4/1974 |
| DE | 24 57 783 C2 | 6/1976 |
| DE | 29 19 236 C2 | 11/1980 |
| DE | 32 40 809 C2 | 5/1984 |
| DE | 38 44 563 A1 | 11/1989 |
| DE | 195 29 038 A1 | 2/1997 |
| DE | 195 43 745 A1 | 5/1997 |
| DE | 198 19 767 A1 | 11/1999 |
| DE | 198 27 606 A1 | 12/1999 |
| EP | 0 612 933 A1 | 2/1994 |
| FR | WO 95/23297 | 8/1995 |
| FR | 2 742 497 | 6/1997 |

OTHER PUBLICATIONS

German Search Report for EP 01 109083, dated Nov. 2, 2001.

* cited by examiner

*Primary Examiner*—Dang Le
(74) *Attorney, Agent, or Firm*—Kennedy Covington Lobdell & Hickman, LLP

(57) ABSTRACT

A rotor spinning device with a contactless passive radial bearing for the spinning rotor. A damping device exerts magnetic forces on the rotor shaft (9) of the spinning rotor by means of operating elements (11, 12), and in this manner damps radially directed oscillations of the spinning rotor. The stationary operating elements (11, 12), which are embodied as magnetic elements, act directly on a magnetic element (8), which is fixedly connected with the rotor shaft (9), wherein the magnetic element (8) is an operative element of the passive bearing of the spinning rotor. A rapid, effective damping of the oscillations is possible without large expenditures.

7 Claims, 4 Drawing Sheets

ROTOR SPINNING DEVICE WITH A CONTACTLESS, PASSIVE, RADIAL BEARING FOR THE SPINNING ROTOR

CROSS REFERENCE TO RELATED APPLICATION

This application claims the benefit of German Application DE P 100 32 440.1 filed Jul. 4, 2001.

FIELD OF THE INVENTION

The present invention relates generally to a rotor spinning device with a contactless, passive, radial bearing for the spinning rotor and with a damping device embodied for damping radially directed oscillations of the spinning rotor. More particularly, the present invention relates to such a rotor spinning device wherein the damping device comprises a sensor arrangement, a control arrangement and an operating arrangement, with the operating arrangement being designed to act on the rotor shaft at least at one active site.

BACKGROUND OF THE INVENTION

So-called passive magnetic radial bearings, wherein the seating of the bearing is accomplished by means of permanent magnets, require a considerably reduced capital outlay in comparison to actively controlled magnetic bearings. With passive magnetic radial bearings, a static stability exists in the radial direction. However, the radial dynamic stability is small. Each excitation of the bearing system leads to undesired weakly damped oscillations. An improvement of this state can be achieved by additional oscillation damping.

A passive oscillation damping of radial oscillations is known from German Patent Publication DE 195 43 745. In this case, the stator magnet of a magnetic bearing is resiliently suspended by telescopic legs. A mechanical friction arrangement is provided for damping those oscillation movements of the stator magnet, which oscillate in a plane parallel with the magnetic faces of the rotor and stator magnets. Friction commences starting at a defined value of the oscillation amplitude. No damping takes place as long as this value has not been reached. Damping beginning with such a delay is an obstacle to a permanent low-oscillation running of the rotor.

German Patent Publication DE 29 19 236 C2 describes a magnetic floating bearing for a rotor, wherein a passive radial stabilization takes place by means of permanent magnets. Damping is achieved by eddy current losses in the manner of an eddy current brake.

German Patent Publication DE 198 19 767 A1 defines the basic type of rotor spinning device to which the present invention pertains and describes a damping device for passive radial bearings of spinning rotors. Damping is performed by means of a friction mechanism, whose friction components have frictional surfaces which can be acted upon mechanically. One of the friction components is radially fixed in place on a bearing element, and the other friction component is held in a manner for radially length-adjustability. The radially length-adjustable friction component has a bearing component which encloses the rotor shaft of the rotor. The appearance of large oscillation amplitudes, wherein the rotor could come in contact with the stator, is prevented by this bearing component. The damping converts the occurring oscillations into friction.

With the known oscillation damping systems described, only a too small or otherwise imperfect damping effect can be achieved. In German Patent Publication DE 198 19 767 A1 an active damping is mentioned as a further possibility for damping contactless seated bearings. However, the document does not provide any further suggestions as to how such an active damping is to be designed. It is only pointed out that a relatively large effort is necessary for active damping.

Wear occurs in connection with damping devices operating by means of frictional effects, which requires additional maintenance, or the replacement of wear elements. If the damping generated frictionally has been set too strongly, the danger arises that no damping is provided by the damping device and instead, with passive bearings, damping occurs in an undesired and completely unsatisfactory manner by the magnetic bearing itself. If damping has been set too weakly, the damping effect is poor even when the damping device operates. For this reason, an optimum is determined when setting the damping effect. So-called damping images, from strong to weak, are set depending on the requirements. The cooperation of the elements of a friction mechanism, by means of which a defined damping value, or a defined damping factor, is set, is a function of the material, temperature, aging and friction, and therefore cannot, or only imperfectly, be reproduced. It is necessary for this reason to repeatedly perform an elaborate optimization.

SUMMARY OF THE INVENTION

It is accordingly an object of the present invention to improve the damping of radial oscillations of a spinning rotor seated by means of passive magnetic bearings without extravagant expense.

In accordance with the invention, this object is attained by means of a rotor spinning device comprising a contactless, passive, radial bearing for the spinning rotor and a damping device for damping radially directed oscillations of the spinning rotor. The damping device comprises a sensor arrangement, a control arrangement and an operating arrangement, with the operating arrangement having at least two stationary magnetic operating elements arranged to act at least at one active site directly on a magnetic element fixedly connected with the rotor shaft for rotation therewith. The rotating magnetic element comprises an operative element of the passive bearing of the spinning rotor.

An extraordinarily efficient and rapidly effective damping of radially directed oscillations of the spinning rotor is possible by means of the device in accordance with the invention. Improved quiet running of the spinning rotor can be achieved in this way.

A particularly low structural expense outlay is sufficient for a device in accordance with the invention, because the rotating magnetic element on which the operating elements act is an operative element of the passive bearing of the spinning rotor. To improve the damping effect, the active site is located near the end of the rotor shaft.

In a preferential embodiment, the sensor device at the active site comprises at least two sensor elements for detecting radial position deviations of the rotor shaft, and the sensor elements and the operating elements at the active site are arranged in a plane extending vertically in relation to the plane of rotation. Preferably the operating elements are arranged in an angularly offset manner in respect to the sensor elements of the active site. Two operating elements are advantageously arranged offset by ninety degrees (90°) in the direction of rotation in respect to each other, and two sensor elements are also advantageously arranged offset by ninety degrees (90°) in the direction of rotation in respect to each other. A structurally compact embodiment of the damping device is thereby possible without a large outlay. The detection of radial positional deviations, as well as the control of the operating elements, can be performed simply and exactly. The control device is designed such that it is possible to take the angular offset of the operating and sensor elements into account during signal evaluation in a simple manner.

The damping force can be doubled in a simple manner if an additional operating element is assigned to each operating element and is located diametrically opposite in relation to the axis of rotation, and if the operating element and the additional operating element each act with the same force on the rotating magnetic element. Here, the force exerted by the operating element and the additional operating element is equal in its size as well as in its direction. The static magnetic forces acting on the rotating magnetic element, and therefore on the rotor shaft, which occur when operating elements are employed, each of which has a magnetic coil with an iron core for generating effective magnetic forces, can be neutralized with this embodiment.

The rotating magnetic element is preferably designed as a permanent magnet ring enclosing the rotor shaft, and the operating elements are preferably arranged at an axial distance in front of the permanent magnet ring. In this manner, it is possible to bring the operating elements very close to the rotating magnetic element, and the air gap between the magnetic element and the operating element can be kept small without interference by the bands around the exterior circumference of the magnetic element. Such bands are customarily placed around the magnetic rings of spinning rotors rotating at a high number of revolutions. The narrower the air gap between the operating element and the magnetic element, the greater the effectiveness of the damping which can be achieved.

The control device preferably has elements which are used for the exclusive capacitive decoupling of the signals generated by the sensor elements. Only the dynamic signal components are transmitted with such an embodiment. As a result, zero point errors of the sensor elements have no effect Because of the limitation of the a.c. portions, only small currents flow which, however, are sufficient for controlling the damping.

In comparison with known devices it is possible by means of the device in accordance with the invention to clearly improve the damping of radial oscillations. The desired optimum of damping can always be achieved without problems and without extensive optimization processes, because the damping effect is reproducible. By means of the invention it is possible without a great outlay to achieve damping which starts without delay and effectively.

Further details, features and advantages of the present invention will be described in the following specification of a preferred embodiment with reference to the accompanying drawings.

DETAILED DESCRIPTION OF THE PREFERRED EMBODIMENTS

Figure 1:
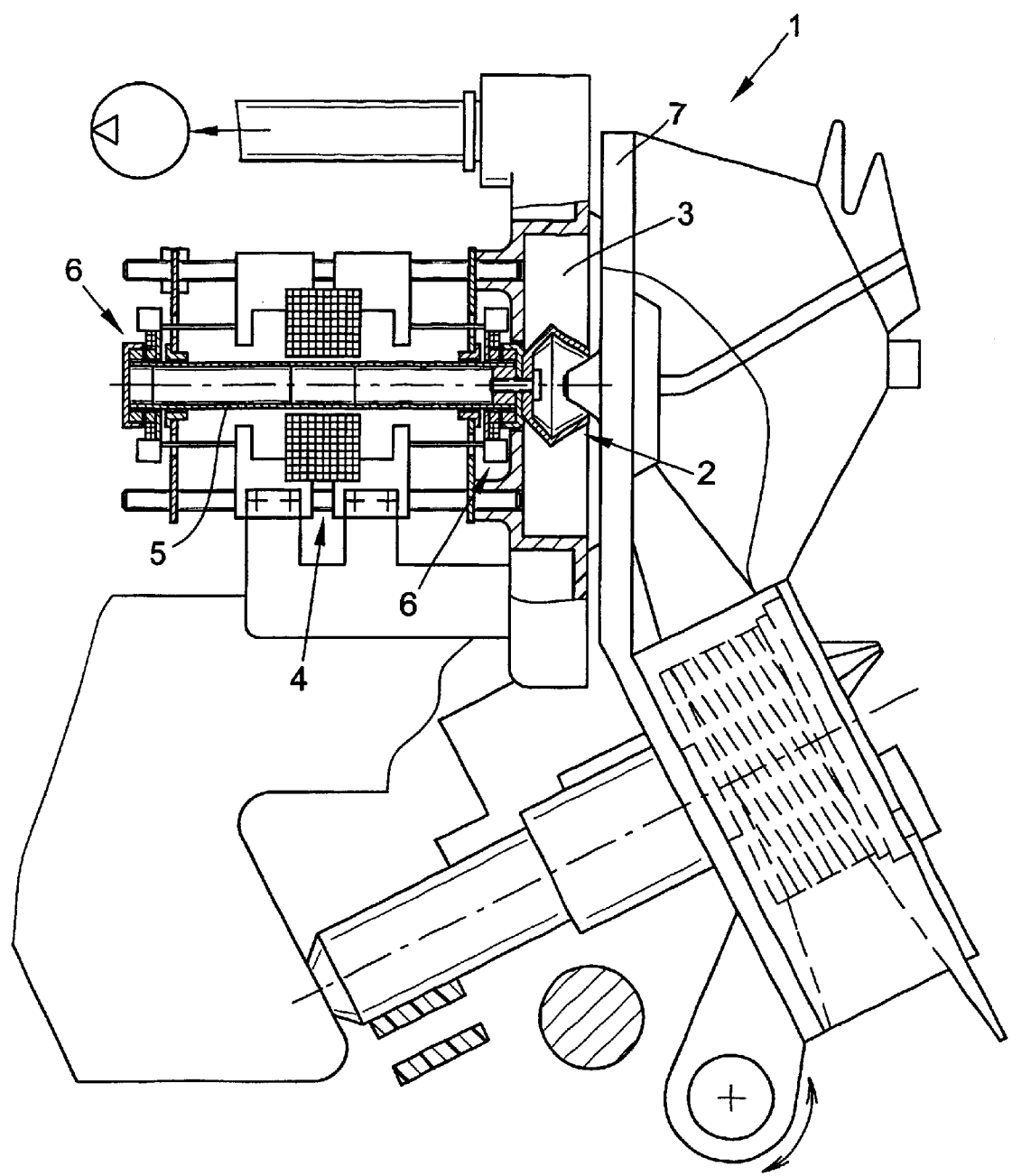
FIG. 1 is a schematic representation in a lateral plan view of a rotor spinning device with a contactless passive spinning rotor bearing, partially in section.

As represented in FIG. 1, a rotor spinning device 1 comprises a spinning rotor 2, whose spinning cup rotates at a high number of revolutions in a rotor housing 3. The spinning rotor is driven by an individual electrical drive mechanism 4. The rotor shaft 5 of the spinning rotor 2 is fixed in place radially as well as axially in a magnetic bearing 6. During the spinning process, the opening of the rotor housing 3 is closed by means of a pivotably seated cover element 7. The magnetic bearing 6 is a passive spinning rotor bearing. Further details regarding a contactless passive spinning rotor bearing can be found, for example, in the already mentioned German Patent Publication DE 198 19 767 A1.

Figure 2:
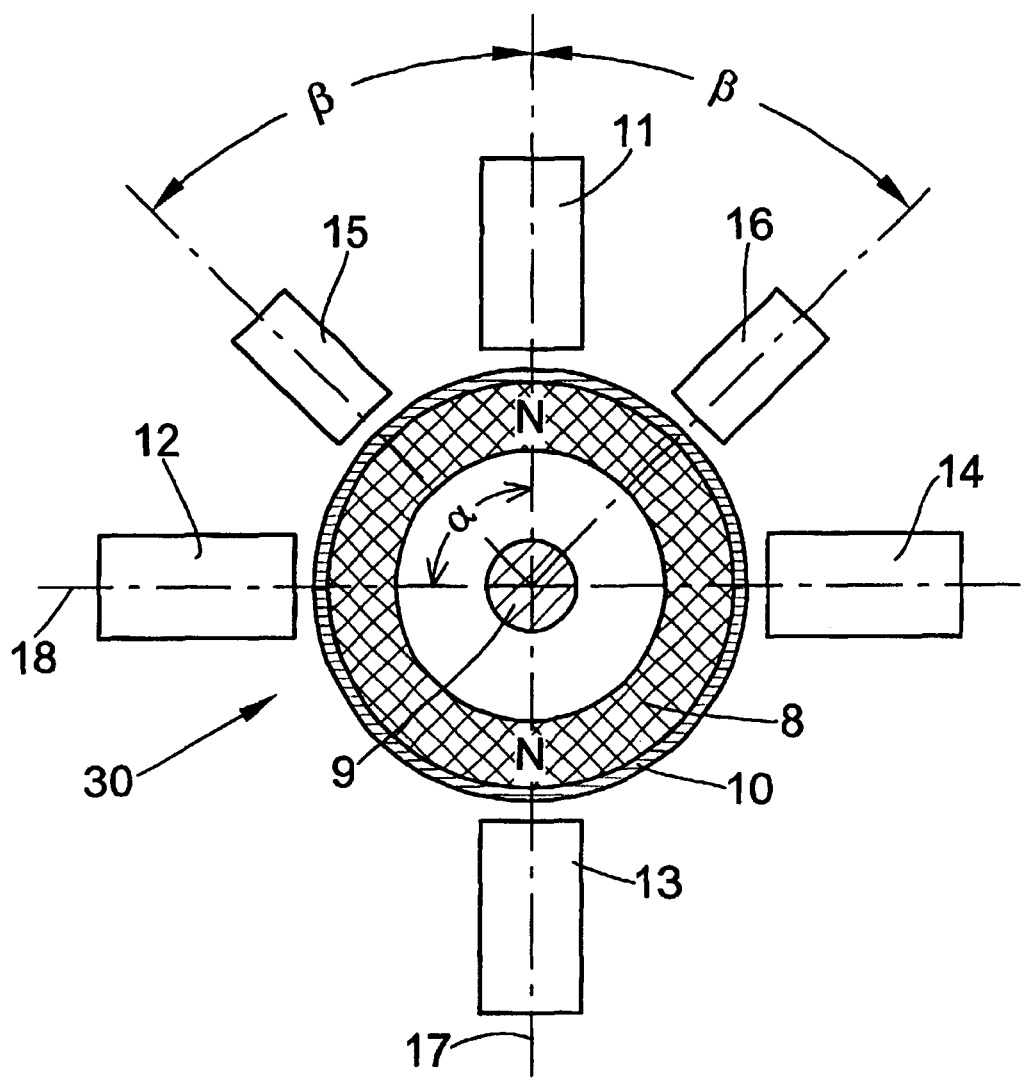
FIG. 2 is a schematic representation of the arrangement of sensor elements and operating elements at an active site of the damping device of a rotor spinning arrangement in a front view.

The magnetic element 8, represented in FIG. 2 and embodied as a permanent magnet ring, is fixedly connected with the rotor shaft 9 of a spinning rotor. The pole end of the permanent magnet ring visible in FIG. 2 is identified by N. The magnetic element 8 is enclosed in a band 10. FIG. 2 shows the position of the operating elements 11, 12, 13 and 14, as well as of the sensor elements 15 and 16. The sensor elements 15, 16 and the operating elements 11, 12, 13, 14 are arranged in a plane extending vertically in respect to the axis of rotation of the rotor shaft 9. The angle a between the operating element 11 and the operating element 12 is 90°. The angle β between the sensor elements 15, 16 and the operating element 11 is respectively 45°. The operating elements 11 and 13 act in the direction of the damping axis 17, and the operating elements 12 and 14 act in the direction of the damping axis 18. It is basically sufficient to employ only a single operating element for each damping axis 17, 18. However, by means of the embodiment represented in FIG. 2 with respectively diametrically oppositely located operating elements 11, 13, 12, 14, it is possible to achieve a greater damping effect.

Figure 3:
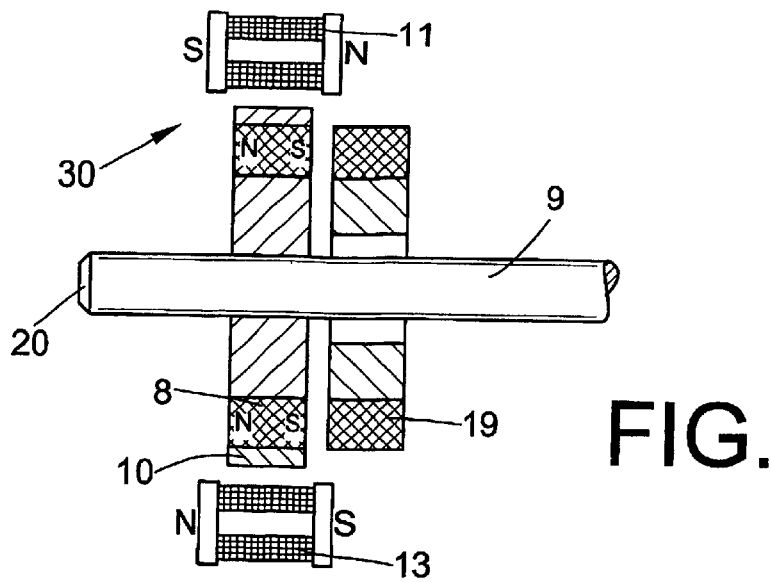
FIG. 3 is a schematic representation in a lateral plan view of the arrangement of an operating element at the active site shown in FIG. 2.

FIG. 3 shows the magnetic element 8, which is fixedly connected with the rotor shaft 9, in a lateral plan view. The magnetic element 8 rotates at a high number of revolutions during the spinning operation. For seating the rotor shaft 9, the magnetic element cooperates with a stationary magnetic element 19 which is also designed as a permanent magnet ring. In the representation of FIG. 3, the operating element 11 is arranged above the magnetic element 8. The operating element 11 also has a pole N and an opposite pole S. The operating element 13 is arranged diametrically opposite the operating element 11 in the representation of FIG. 3 below the magnetic element 8. The active site 30 with the magnetic element 8 is located close to the end 20 of the rotor shaft 9. Each of the operating elements 11, 12, 13, 14 has a magnetic coil with an iron core.

Figure 4:
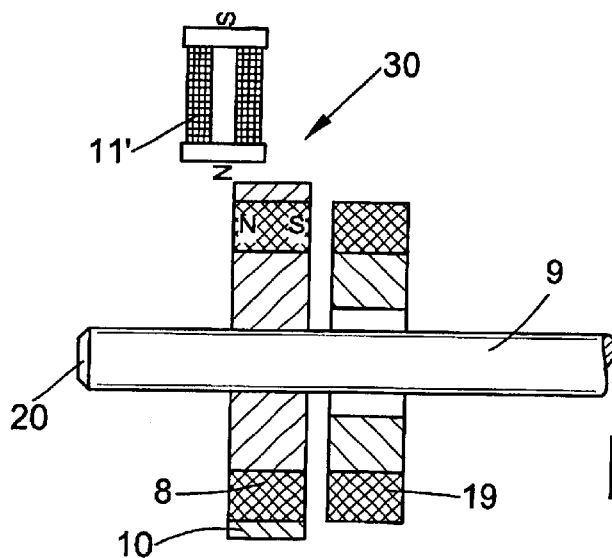
FIG. 4 is a representation of an alternative arrangement of an operating element, corresponding to the view in FIG. 3.

FIG. 4 shows an alternative embodiment, wherein the operating element 11' takes up a position, wherein the pole, identified by N, of the operating element 11' faces the magnetic element 8.

Figure 5:
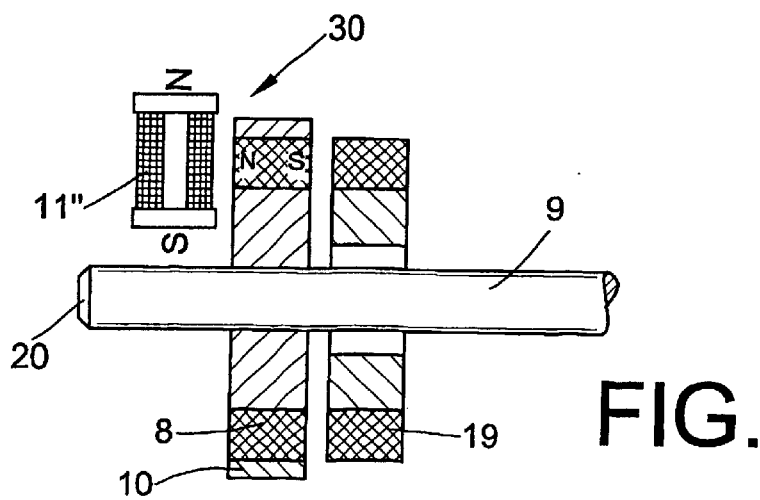
FIG. 5 is a representation of a further alternative arrangement of an operating element, corresponding to the view in FIG. 3.

FIG. 5 shows a further alternative embodiment. The operating element 11" is arranged at an axial distance from the magnetic element 8. The air gap between the operating element 11" and the magnetic element 8 is kept relatively narrow. The setting of a very narrow air gap is not hampered by the band 10 in this embodiment.

Figure 6:
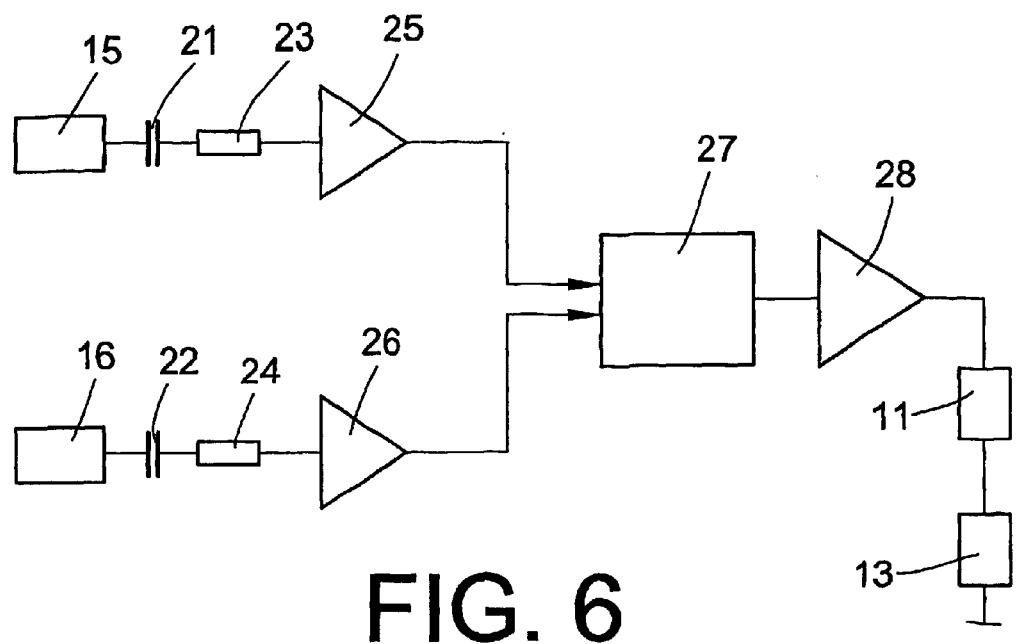
FIG. 6 is a schematic representation of a first control loop with the two sensor elements and the two operating elements of the representation in FIG. 2.
Figure 7:
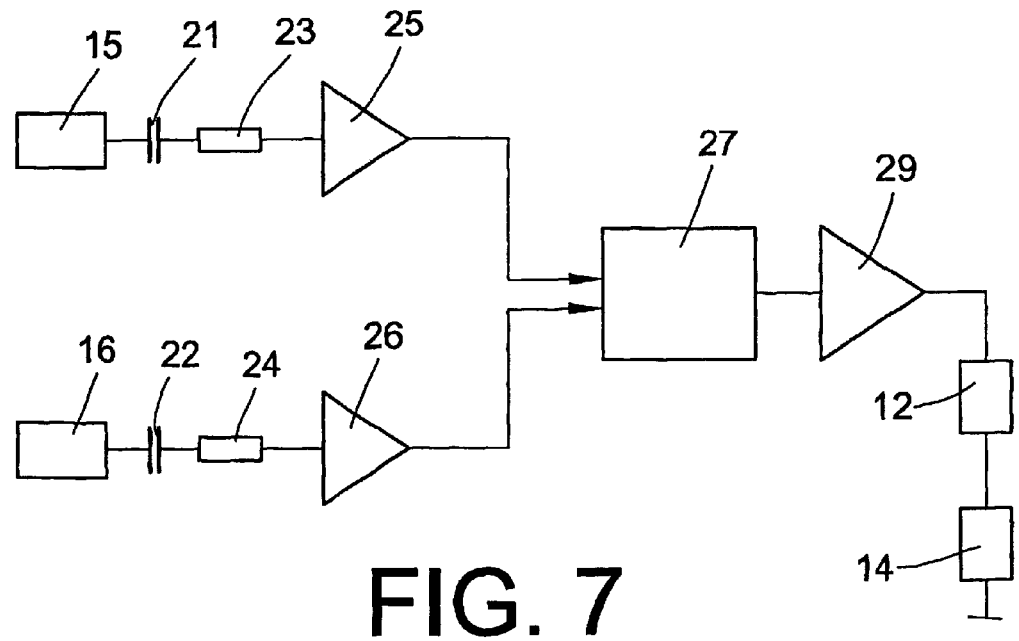
FIG. 7 is a schematic representation of a second control loop with the two sensor elements and the two operating elements of the representation in FIG. 2.

FIGS. 6 and 7 show control loops for controlling the cooperating operating elements 11 and 13, as well as the cooperating operating elements 12 and 14 of the device represented in FIGS. 2 and 3. A capacitor 21 is used for coupling the signals generated by the sensor element 15 and it passes on the signal to the control device 27 via the resistor 23 and the amplifier 25. The capacitor 22 is arranged for coupling the signals generated by the sensor element 16 and it passes on the signal to the control device 27 via the resistor 24 and the amplifier 26. The signals conducted to the control device 27 by the amplifiers 25 and 26 are added. The angular offset between the sensor elements 15 and 16 and the operating elements 11 and 13 is taken into consideration in this manner. The sensor elements 15 and 16 operate inductively.

In the control loop represented in FIG. 7, the signal generated by the sensor element 15 is conducted to the control device 27 in the same way as in the control loop represented in FIG. 6. The signal generated by the sensor element 16 and coming from the amplifier 26 is inverted in the control device 27. Thus, the value of this signal enters the addition as an inverted value. The sum determined by addition from both signals is the value on which the control signal is based, which is conducted via the amplifier 29 to the operating elements 12 and 14.

In an embodiment of the invention not represented, the amplifier 26 for controlling the operating elements 12 and 14 operates as an inverting amplifier. The damping process is controlled, as a function of the signals generated by the sensor elements 15 and 16, by the strength of the current, which is respectively conducted via the amplifiers 28, 29 to the operating elements 11, 13, as well as the operating elements 12, 14.

A pole change of the operating elements 11, 13, 12, 14 can be performed by a reversal of the current direction. In this way it is possible to control the strength, as well as the direction, of the magnetic force with which the rotor shaft 9 is charged for damping.

If, because of an oscillation, a deflection of the rotor shaft 9 occurs, wherein the position of the rotor shaft 9 deviates downward from the desired position in the representation in FIG. 3, the poles of the operating element 11 are oriented as represented in FIG. 3. Because of the position of the poles of the operating element 11, the latter attracts the magnetic element 8 designed as a permanent magnet ring, while the operating element 13 repels the magnetic element 8. The position deviation caused by oscillation is counteracted in this way and the oscillation is thereby damped.

As represented in FIGS. 6 and 7, the operating elements 11 and 13, or 12 and 14, can be arranged in series or, in an alternative embodiment, not represented, in parallel.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A rotor spinning device comprising a contactless, passive, radial bearing for the spinning rotor and a damping device external the passive radial bearing for damping radially directed oscillations of the spinning rotor, the damping device comprising a sensor arrangement, a control arrangement and an operating arrangement, the operating arrangement having at least two stationary magnetic operating elements arranged to act directly at least at one active site on a permanent magnet fixedly connected with the rotor shaft for rotation therewith, the rotating permanent magnet comprising an operative element of the passive bearing of the spinning rotor.

2. The rotor spinning device in accordance with claim 1, characterized in that the sensor device at the active site comprises at least two sensor elements for detecting radial position deviations of the rotor shaft, and the sensor elements and the operating elements at the active site are arranged in a plane extending vertically in respect to the axis of rotation.

3. The rotor spinning device in accordance with claim 1, characterized in that the operating elements are arranged with an angular offset in respect to the sensor elements of the active site.

4. The rotor spinning device in accordance with claim 2, characterized in that the two operating elements are arranged angularly offset by 90 degrees in respect to each other, and the two sensor elements are arranged angularly offset by 90 degrees in respect to each other.

5. The rotor spinning device in accordance with claim 1, characterized in that an additional operating element is assigned to each operating element and is located diametrically opposite in respect to the axis of rotation, and that each operating element and the additional operating element act in the same direction and with an essentially equal force on the rotating magnetic element.

6. The rotor spinning device in accordance with claim 1, characterized in that the rotating magnetic element comprises a permanent magnet ring enclosing the rotor shaft, and the operating elements are arranged at an axial distance in front of the permanent magnet ring.

7. The rotor spinning device in accordance with claim 1, characterized in that the control device comprises elements for an exclusively capacitive coupling of the signals generated by the sensor elements.

* * * * *